Nov. 2, 1954

J. J. MILLER 2,693,166

FLUX APPLYING APPARATUS

Filed May 26, 1952

INVENTOR.
JAMES J. MILLER
BY
ATTORNEYS

Nov. 2, 1954    J. J. MILLER    2,693,166
FLUX APPLYING APPARATUS
Filed May 26, 1952    2 Sheets-Sheet 2

INVENTOR.
JAMES J. MILLER
BY
ATTORNEYS

United States Patent Office 2,693,166
Patented Nov. 2, 1954.

2,693,166

FLUX APPLYING APPARATUS

James J. Miller, Detroit, Mich., assignor to Kelsey-Hayes Wheel Company, Detroit, Mich., a corporation of Delaware Application May 26, 1952, Serial No. 289,981

7 Claims. (Cl. 118—7)

The invention relates to apparatus for applying flux to circular articles and refers more particularly to apparatus for applying a coating of flux material to the inner surfaces of the brake flanges of brake drum shells prior to the centrifugal casting of brake linings in the flanges.

The invention has for one of its objects the provision of an improved apparatus comprising a conveyor for advancing the circular articles, means for rotating the articles during their advance and means for spraying flux material on the articles during their rotation.

The invention has for another object to provide an improved apparatus in which a driven endless belt is engageable with the articles during their advance to rotate the same and the hangers of the conveyor are constructed to carry the articles to and from the belt and to move the articles over the belt and permit their rotation while being sprayed.

The invention has for a further object to provide an improved apparatus in which the means for spraying the articles operates intermittently and is automatically controlled to operate while the articles are in spraying position.

These and other objects of the invention will become apparent from the following description taken in connection with the accompanying drawings in which.

The apparatus for applying flux is designed particularly for use in spraying flux upon the inner surfaces of brake drum shells preparatory to centrifugally casting brake linings within the shells. The shells are of the type having webs with central hub receiving apertures and annular brake flanges which may be formed with reinforcing ribs.

As illustrated in Figures 1, 2, 3 and 4, the apparatus comprises the booth 1, the conveyor 2 for continuously advancing the brake drum shells, the belt 3 for rotating the shells during their advance and the spray guns 4 for spraying flux material against the inner sides of the brake flanges of the shells while they are being rotated. A furnace is preferably located in advance of the booth for heating the shells prior to applying the flux coating.

Figure 1:
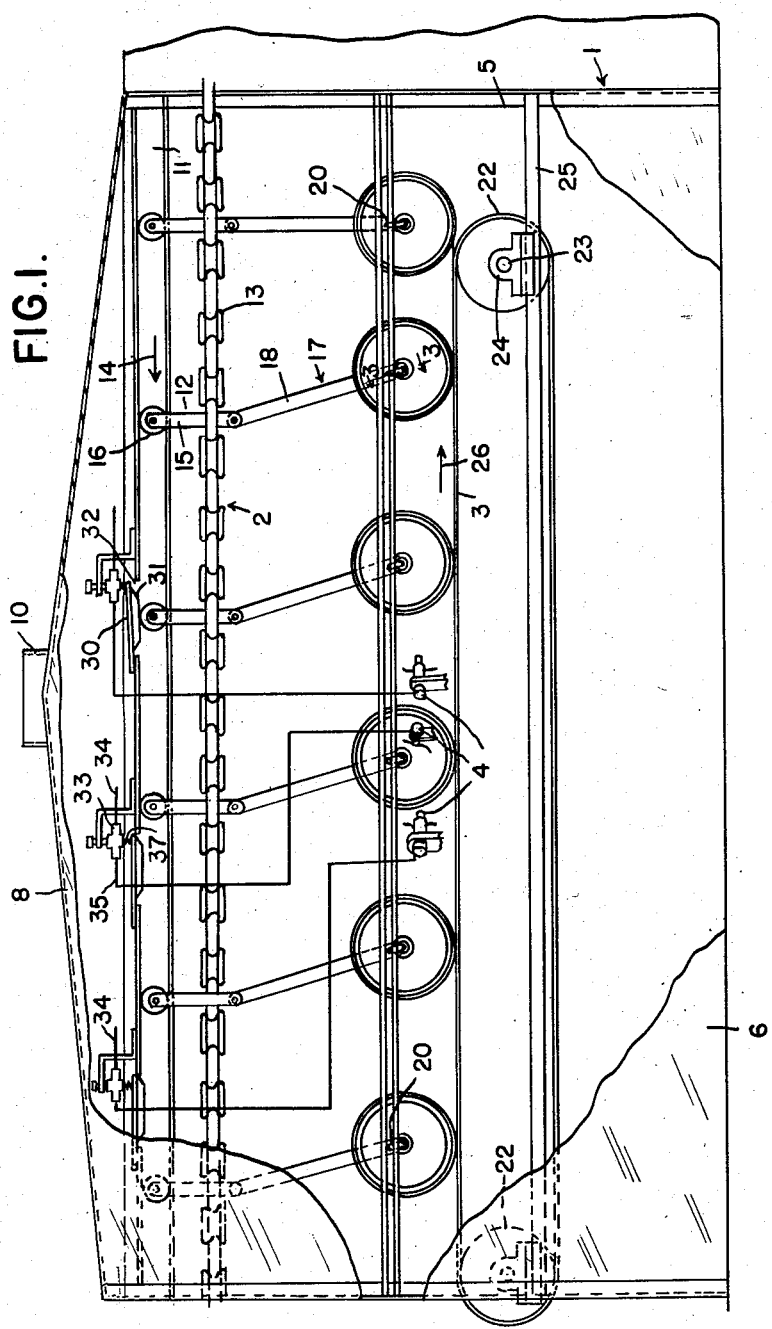
Figure 1 is a side elevation with parts broken away of a flux applying apparatus embodying the invention.
Figure 2:
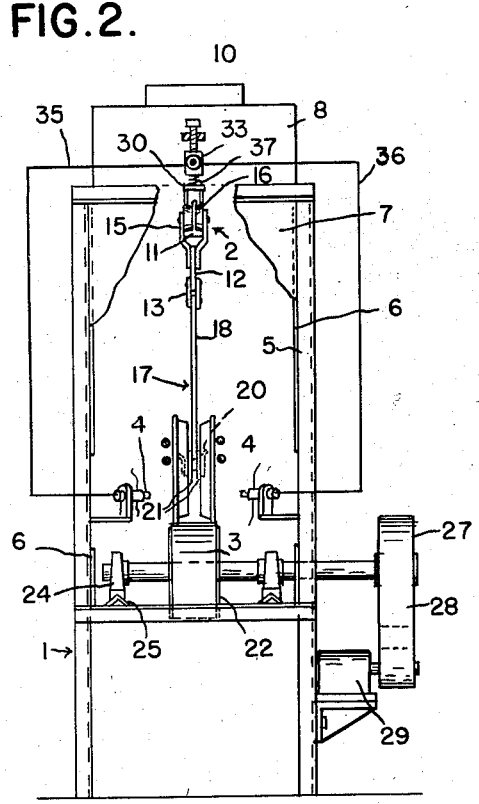
Figure 2 is an end elevation thereof with parts broken away and in section.
Figure 3:
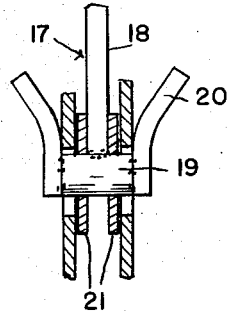
Figure 3 is an enlarged cross section on the line 3—3 of Figure 1.

The booth has the frame 5, the side plates 6 secured to the frame, the end plates 7 also secured to the frame and the dome 8 resting on and secured to the frame and provided with the exhaust stack 10. The conveyor 2 has the I-beam rail 11 extending longitudinally centrally through the upper portion of the booth and supported on its frame, the trolleys 12 mounted upon and movable along the track and the chain 13 connected to the trolleys. The conveyor is endless and the chain is driven in the usual manner to advance the trolleys at a substantially constant speed in the direction indicated by the arrow 14 as shown in Figure 1. As shown in the present instance, each trolley 12 has the frame 15, the wheels 16, and the hanger 17. The frame is formed of side plates having upper portions which embrace the lower flanges of the track and at the upper ends of which are journalled the wheels 16 which rest on and are movable along the lower flanges of the tracks. The lower portions of the side plates embrace and have pivotally connected thereto the bar 18 of the hanger 17. The bar has fixedly secured to its lower end the transverse cylindrical member 19 and the ends of this cylindrical member have fixedly secured thereto the bars 20 which extend upwardly above the transverse member and diverge with respect to each other and also with respect to the bar 18. Also there are the plates 21 at opposite sides of bar 18 and encircling the transverse member 19 and fixedly secured to this plate and transverse member.

The upwardly extending portions of the bars 20 are spaced from the plates 21 so that the brake drum shells may be mounted on the hanger at opposite sides of its depending bar 18 with the centrally apertured webs of the shells sleeved over and resting on the transverse member 19 and located between the bars 20 and the plates 21 and the brake flanges of the shells extending away from the hanger bar and toward the sides of the booth.

The belt 3 is endless and extends longitudinally centrally of the booth directly below the conveyor and around the pulleys 22 which are mounted on the shafts 23 extending transversely of the booth and journalled in the bearings 24. These bearings rest on and are secured to the longitudinal bars 25 which in turn rest on and are secured to transverse bars of the frame 5. The belt is located so that its upper portion is at an elevation above the lower surfaces of the shells in their normal position assumed during their advancement. As a result the upper portion of the belt is engageable with the brake flanges or their reinforcing ribs and supports the shells while being pulled over the upper belt portion. The belt is driven so that its upper portion moves in the direction of the arrow 26 shown in Figure 1 and opposite to the direction of travel of the conveyor through the booth. In detail, one of the shafts 23 extends through the booth and has secured to its outer end the pulley 27 which is driven by means of the belt 28 extending over this pulley and a pulley upon the drive shaft of the electric motor 29.

Figure 4:
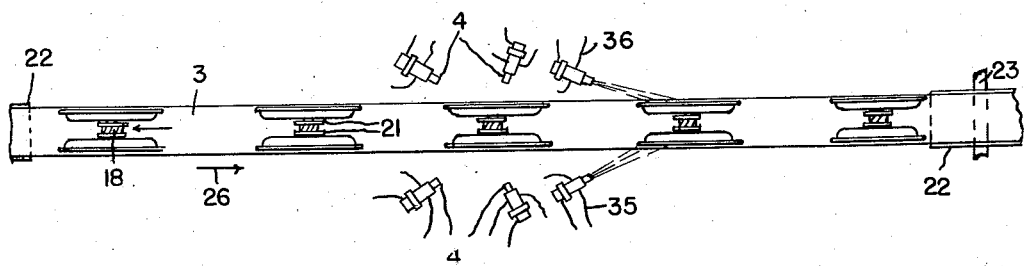
Figure 4 is a diagrammatic view illustrating the discharge angles of the spray guns for applying the flux.

Each of the spray guns 4 for spraying flux material upon the inner surfaces of the brake flanges of the brake drums is of conventional construction, each spray gun in the present instance, being a DeVilbiss spray gun. The spray guns, as shown, comprise three pairs of guns mounted on the frame of the booth with the guns of each pair at opposite sides of the belt 3 and having their discharge axes at the same angle with respect to the belt. The discharge angles for each pair of guns, as shown particularly in Fig. 4, are different to secure better distribution. The operation of the pairs of guns is automatically controlled so that one pair is in operation at a time to operate the brake drums in line with the discharge axes of the guns. The control is effected by the levers 30 pivotally mounted on the track 11 and having the cam portions 31 extending downwardly through the notches 32 in the upper flanges of the track for engagement by the trolley wheels 16. The length of the cam portions controls the length of spraying time. 33 are air valves above the free ends of the levers and mounted on the track and having their inlets connected by the tubing 34 to the source of compressed air and their outlets connected by the tubing 35 and the tubing 36 to the spray guns 4 at opposite sides of the belt 3. The coil springs 37 are located between the levers and the valve stems to open the valves upon upward camming of the levers and effect operation of the spray guns.

In operation, with the conveyor 2 and the belt 3 being driven at substantially constant speeds in the directions indicated by the arrows 14 and 26 and with brake drum shells on the hangers 17, the shells after entering the booth 1 are elevated and drawn along the upper portion of the belt and rotated thereby. During the advance of the shells, the trolley wheels 16 successively operate the valves 33 through the levers 30 thereby opening the valves 33 and successively putting the pairs of spray guns 4 in operation to spray flux material on the shells which are opposite the spray guns. The spraying is discontinued when the trolley wheels leave the cam portions 31 of the levers. During the further advance of the shells they are drawn off the upper portion of the belt and again supported by the trolleys.

What I claim as my invention is:
1. Apparatus for applying flux to brake drum shells having webs with central hub receiving apertures comprising a driven endless belt having an upper portion movable in one direction and engageable with the peripheries of the brake drum shells to rotate the same, a driven conveyor for continuously advancing the brake drum shells in the opposite direction, said conveyor having depending hangers provided with portions extending freely through the central apertures providing for rotation of the shells, said hangers carrying the brake drum shells beyond said belt and drawing the brake drum shells over the upper portion of said belt and means for spraying flux on the brake drum shells while being rotated by said belt.

2. Apparatus for applying flux to brake drum shells having webs with central apertures comprising a driven endless belt having an upper portion movable in one direction and engageable with the brake drum shells to rotate the same, a conveyor for continuously advancing the brake drum shells in the opposite direction, said conveyor having means extending through the central apertures providing for rotation of the brake drum shells and carrying the brake drum shells beyond said belt and also moving the brake drum shells while in engagement with said belt, a spray gun for spraying flux on the brake drum shells while engaging said belt, a valve for controlling the flow of air to said spray gun and means operable by said conveyor for yieldably actuating said valve.

3. Apparatus for spray coating circular articles comprising an upwardly-facing support engageable with the articles to rotate the same, a driven conveyor for continuously advancing the articles in one direction, said conveyor having depending hangers provided with portions rotatably supporting said articles, said hangers carrying the articles beyond said support and drawing the same over said support for engagement therewith to rotate the articles, and means for spray coating the articles while being rotated by said support.

4. The apparatus defined in claim 3, in which said support comprises a driven belt movable in the opposite direction and spaced above the lower portions of the articles thus supported by said hangers whereby to support and elevate the articles upon engagement therewith, and including means operable by said conveyor for controlling said spraying means.

5. Apparatus for applying flux to brake drum shells having webs with central hub receiving apertures comprising a driven conveyor adapted to continuously advance the brake drum shells in one direction along a predetermined path and having depending hangers provided with portions extending freely through the central apertures of the brake drum shells to rotatably support the same, an upwardly facing support positioned along said predetermined path and spaced above the lower portions of the brake drum shells thus supported by said hangers, thereby to support the peripheries of the shells and elevate and rotate the same as they are drawn over the upper portion of said belt, and means for spraying flux on the shells while being rotated by said belt.

6. Apparatus for applying flux to brake drum shells having webs with central hub receiving apertures comprising a driven conveyor adapted to continuously advance the brake drum shells in one direction along a predetermined path and having trolleys provided with hangers having portions extending freely through the central apertures of the brake drum shells to rotatably support the same, an endless driven belt positioned along said predetermined path and having an upper portion spaced above the lower portions of the brake drum shells thus supported by said hangers, the upper portion of said belt being movable in the opposite direction and engageable with the peripheries of the shells to support the shells and to elevate and rotate the same as they are drawn over the upper portion of said belt, means for spraying flux on the shells during rotation, and means operable by said trolleys for controlling said flux spraying means.

7. The apparatus defined in claim 6, in which said hangers are pivotally attached to said trolleys for swinging movement about axes extending transversely of said predetermined path.

References Cited in the file of this patent

UNITED STATES PATENTS

| Number | Name | Date |
|---|---|---|
| 1,198,020 | Graham | Sept. 12, 1916 |
| 2,210,187 | Ross | Aug. 6, 1940 |
| 2,345,834 | Schweitzer | Apr. 4, 1944 |
| 2,383,023 | Sykes et al. | Aug. 21, 1945 |
| 2,463,422 | Ransburg et al. | Mar. 1, 1949 |